United States Patent [19]

Floyd et al.

[11] Patent Number: 4,844,609

[45] Date of Patent: Jul. 4, 1989

[54] APPARATUS AND METHOD FOR ALIGNING ELEMENTS OF A DRIVE TRAIN OF A VEHICLE, ESPECIALLY A HEAVY-DUTY, LOAD-CARRYING VEHICLE

[75] Inventors: Scot T. Floyd, Kentwood, Mich.; Michael P. McGarry, 521 S. Anderson, Plainwell, Mich. 49080

[73] Assignee: Michael P. McGarry, Plainwell, Mich.

[21] Appl. No.: 150,302

[22] Filed: Jan. 29, 1988

[51] Int. Cl.$^4$ .............................................. G01B 11/27
[52] U.S. Cl. ...................................... 356/154; 33/288; 33/293
[58] Field of Search ............... 356/138, 154, 155, 399, 356/400; 33/288, 293

[56] References Cited

U.S. PATENT DOCUMENTS 3,962,796 6/1976 Johnston .......................... 356/154 X Primary Examiner—F. L. Evans
Attorney, Agent, or Firm—Gordon W. Hueschen

[57] ABSTRACT

The disclosure is of apparatus and method for detecting and correcting malalignment in the drive train of a vehicle, especially a heavy-duty, load-carrying vehicle, which drive train comprises a drive shaft articulated by a universal joint and a rear end comprising a transverse axle adapted to drive wheels. Laser beam targets are affixed to the drive shaft in such an alignment that, when a laser beam is projected through them, deviations from the normal are revealed. The targets are semi-transparent members having opaque cross hairs thereon which are adjustable up and down and are mounted so that the vertical cross hairs are in line with a vertical diameter of the drive shaft. A prism-bearing target is affixed to the differential of the vehicle in alignment with the laser beam. The prism is adapted to refract the laser beam at 90° and is mounted so that it can be set either at 0° or 180° and positioned so that the refracted beam, in one position, is in position to impinge on one wheel, brakedrum, or the like and, in the other position, on the other wheel, whereby any deviation from the normal becomes apparent from detected asymmetry and can be corrected.

24 Claims, 3 Drawing Sheets

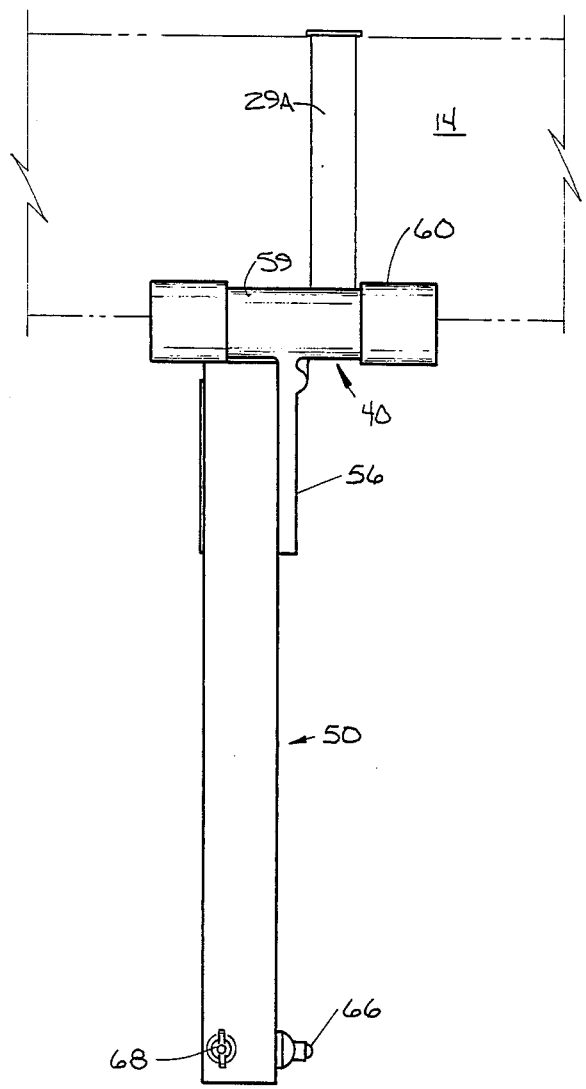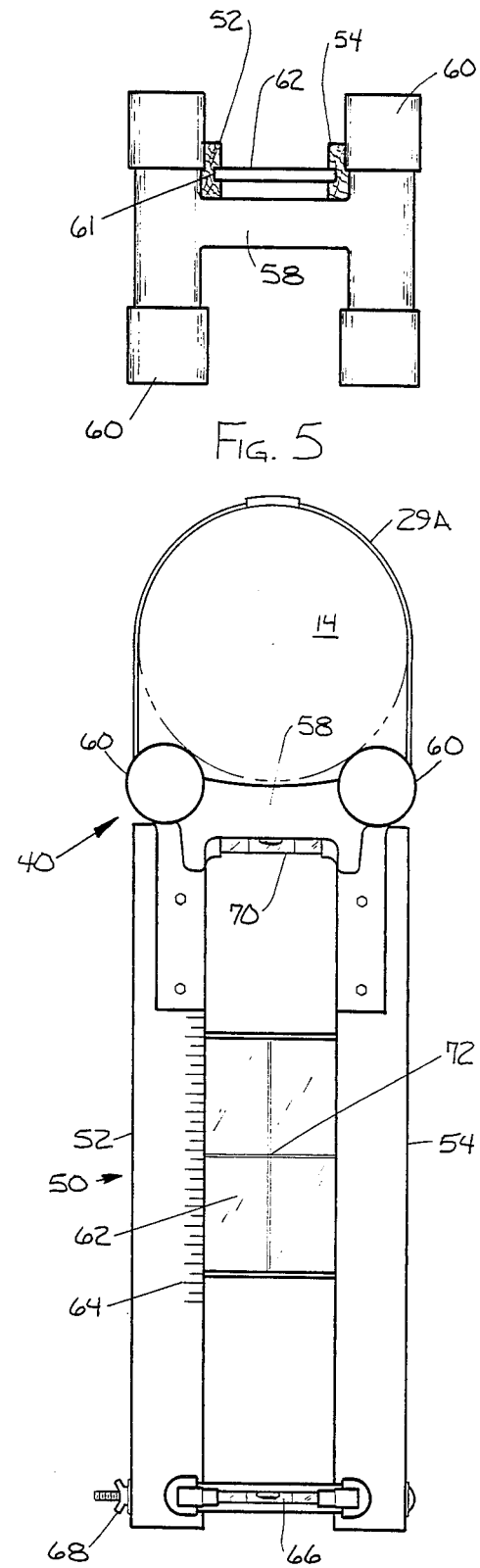

APPARATUS AND METHOD FOR ALIGNING ELEMENTS OF A DRIVE TRAIN OF A VEHICLE, ESPECIALLY A HEAVY-DUTY, LOAD-CARRYING VEHICLE

FIELD AND BACKGROUND OF THE INVENTION

This invention relates to an apparatus and process for aligning elements of a drive train of a vehicle, especially a heavy-duty, load-carrying vehicle, but not limited thereto, and is particularly directed to apparatus and method for aligning the drive shaft and the rear axle of a vehicle.

Heavy-duty, load-carrying vehicles commonly have an articulated drive shaft connected by a driven spline or like connecting means with a transmission and by a drive spline or like connecting means with a differential. The drive shaft is articulated by means of a universal joint to accommodate the up and down motion of the differential according to the load placed on the vehicle and the unevenness of the terrain. The differential drives a rear axle which has right and left components driving right and left rear wheels.

Optimally the drive shaft is aligned in a vertical plane through the two splines and the rear axle is normal to this plane. The part of the drive shaft between the driven spline and the universal joint optimally is in a plane parallel to the frame of the vehicle or the ground. However, due to heavy loads and rough usage, and sometimes to improper servicing, the drive shaft tends to become displaced out of its optimal vertical alignment and the front section out of its optimal horizontal alignment. Sometimes, also, new vehicles have sub-optimal alignments in the drive train, whether due to careless workmanship or to the lack of adequate equipment to effect optimum alignment.

OBJECTS OF THE INVENTION

It is an object of the invention to provide apparatus and method for effectively, easily, and economically correcting the aforesaid types of malalignment in the drive train of a vehicle, especially but not limited to heavy-duty load-bearing vehicles. Other objects are to avoid the disadvantages of the prior art and to obtain such advantages as will appear as the description proceeds.

PRIOR ART

No means has been heretofore available for effectively, easily, and economically detecting and correcting maladjustment in such elements of a vehicle, especially a heavy-duty, load-bearing vehicle. Particularly there has not been available any such means wherein a laser beam is utilized. It is known, as will be more particularly pointed out hereinafter, that laser beam generators are commercially available which have the capability of lining up sewer tile and setting the pitch or slope of the resulting sewer. However, these prior systems or devices in and of themselves are not able to accomplish the purposes of this invention. Also, there are divers laser beam-generating devices used for aligning shafts and other objects such as those shown in U.S. Pat. Nos. 3,533,700, 3,723,013, 3,902,810, and 4,518,855, but these are not satisfactory for the purpose of this invention and heretofore no satisfactory means has been available for effectively, easily, and economically determining maladjustment of segments of the power train of a heavy-duty, load-bearing vehicle. Thus, the first of these patents (3,533,700) projects laser beams in diametrically opposed directions and, if desired, refracts them into parallel beams. This system is not adapted to alignment of elements of a drive train as in the present invention. The second (3,723,013) discloses the use of a laser beam and targets having photoactive segments and an aperture in all but the last to pass a laser beam. By the use of the device, a plurality of surfaces can be lined up in a common plane. The device, however, is not capable of accomplishing the purposes of this invention. The third (3,902,810) disclose how a laser beam and targets can be used for aligning components of a turbogenerator or other apparatus which has a centerline which sags in a vertical direction. This structure is not capable of effecting alignments as described herein. The fourth (4,518,855) discloses means wherein a radiation beam is used to align, check, or monitor the alignment of two shafts without the need for rotating them. This is not relevant to the invention because the purpose of the invention is not simply to align two shafts.

SUMMARY OF THE INVENTION

The invention relates to apparatus for detecting malalignment of elements of a drive train of a vehicle, especially a heavy-duty, load-carrying vehicle, and particularly such type of vehicle in which said elements include a transmission and a differential, an articulated drive-shaft means comprising segments coupled by universal-joint means, one segment of which is connected by a driven connecting means with said transmission and another segment of which is connected by a drive connecting means with said differential which has right and left rear axle components adapted to drive right and left wheels and in which said drive train, in its optimum condition, has the forward element of said drive shaft aligned substantially in a horizontal plane parallel to the frame of said vehicle, has all segments of said drive shaft aligned in a vertical plane delineated by a centerline which connects both said driven connecting means and said drive connecting means, and has said axle normal to said vertical plane, which apparatus comprises:

means for generating a laser beam;

means for causing said beam to be projected in said vertical plane below and substantially parallel to said centerline; and maladjustment-determining laser-beam target means interposed in the path of the laser beam having means thereon delineating any deviation of the drive train from said optimum when the laser beam impinges thereon.

The apparatus of the invention also includes one or more further features in which a drive-shaft maladjustment-determining target means is located adjacent said universal joint means where it is responsive to any deviation from the optimum relative to said vertical and horizontal planes; in which a rear-axle maladjustment-determining target means is disposed in proximity to said axle and comprises prism means rotatable through 180° from one horizontal position to another which causes the laser beam to be bent at 90° and projected in a plane determined by the point where the beam is bent and the rear axle in a direction in a position to impinge on one wheel or brakedrum and then is bent in the opposite direction by the same prism rotated 180° and projected in the same plane in the opposite direction in a position to impinge on the other wheel or brakedrum, whereby any deviation from the normal position of the rear axle is shown, and/or in which alignment-determining target means is located adjacent to each said connecting means for determining when said laser beam is properly aligned, said targets being sufficiently transparent to pass said laser beam and sufficiently opaque that the point of impingement of the laser beam thereon is visible, and/or in which each said alignment-determining and said drive shaft maladjustment-determining laser-beam target means comprises a semi-transparent member having cross hairs thereon arranged in vertical and horizontal positions and means for adjusting the position of said member up and down relative to said drive shaft, and means for affixing said target means to said drive shaft so that the vertical cross hair is in alignment with the center of said shaft at the point of attachment; in which there are two said drive shaft maladjustment-determining, laser-beam target means adjacent to a universal joint means, one on the transmission side of the universal joint means and the other on the differential side of the universal joint means; and in which the prism-carrying, laser-beam target means comprises a base member having mounted thereon a rotatable prism means which can be rotated 180° from one horizontal to another in a direction normal to said laser beam and adjusted angularly up and down in said vertical plane as needed to present a face of said prism normal to the primary laser beam whereby, when the primary laser beam impinges on said face, it is bent at 90° to form a secondary laser beam, said base member being affixed to said differential in a position such that, when the secondary laser beam is directed along the left horizontal, it is in a position to impinge on the left wheel or brakedrum and, when it is directed along the right horizontal, it is in a position to impinge on the right wheel or brakedrum, whereby any malalignment of the rear axle from its position normal to said vertical plane will be revealed by any asymmetry between the left and right points of impingement.

The invention furthermore is directed to target means for use in alignment of parts of the drive train of a vehicle, especially a heavy-duty, loadcarrying vehicle, which comprises a base member, mounting means at the top thereof for mounting the base member on the vehicle with its centerline in a vertical depending position, indicating means for indicating when the centerline is in the vertical position, and laser-beam receptor means on said base member, said receptor being mounted for adjustment up or down on said base member on said centerline; and includes one or more further features in which the laser-beam receptor means comprises a semi-transparent plate mounted for vertical sliding movement on said base member, means for locking said plate in whatever position it has been adjusted to, said plate having cross hairs the vertical one of which is aligned in the centerline of said base member and being sufficiently transparent to pass said laser beam and sufficiently opaque that the point of impingment of the laser beam theron is visible; in which the mounting means comprises a Y-shaped yoke adapted to straddle the underside of a drive shaft and means affixed to the opposite arms thereof adapted to tighten said yoke against a drive shaft, said tightening means comprising strap means with means for drawing the same tight around the shaft; in which the laser-beam receptor comprises a rotatable prism which is adjustable angularly up and down in a vertical plane as needed to present a face of the prism normal to a primary laser beam and is adapted to be rotated through an angle of 180° from one position in which the secondary beams exiting therefrom are normal to the primary laser beam; and in which the mounting means comprises a Y-shaped yoke adapted to fit the underside of the differential and having protuberances on each arm of the yoke adapted to be inserted in bolt-holes in the differential, said protuberances being canted so that said base member hangs down at an angle.

The invention also relates to a method for correcting malalignment of elements of a drive train of a vehicle, especially a heavy-duty, load-carrying vehicle in which said elements include a transmission and a differential, an articulated drive-shaft means comprising segments coupled by universal-joint means, one segment of which is connected by a driven connecting means with said transmission and another segment of which is connected by a drive connecting means with said differential which has right and left rear axle components and right and left wheels and in which said drive train, in its optimum condition, has the forward element of said drive shaft aligned substantially in a horizontal plane parallel to the frame of said vehicle or the ground, has all segments of said drive shaft aligned in a vertical plane delineated by a centerline which connects both said driven connecting means and said drive connecting means, and has said axle normal to said vertical plane, which method comprises:

generating a laser beam;

causing said beam to be projected in said vertical plane below and substantially parallel to said centerline;

interposing maladjustment-determining laser-beam target means in the path of the laser beam having means thereon delineating any deviation of the drive train from said optimum when the laser beam impinges thereon; and adjusting said drive train to correct maladjustment thus revealed.

The method of the invention further comprises affixing an alignment-determining target having vertically-adjustable cross hairs to said drive shaft adjacent to said differential in a manner such that a vertical cross hair is in alignment with a vertical diameter of said shaft;

generating a laser beam at the opposite end of said drive shaft and directing the laser beam generally to impinge on said target in the vicinity of said cross hairs;

affixing a second alignment-determining target having vertically-adjustable cross hairs to said drive shaft adjacent said laser-beam generator;

adjusting said cross hairs and said laser beam to bring them into alignment with the laser beam diametrically below and substantially parallel to the centerline connecting the opposite ends of said drive shaft;

affixing maladjustment-determining target means having vertically-adjustable cross hairs one of which is in vertical alignment with a vertical diameter of said shaft to said shaft adjacent the midportion thereof;

said targets being semi-transparent and the point of impingement of the laser beam thereon showing up thereon as a red dot which, when there is horizontal malalignment, the dot on the remote alignment-determining target has plural vertical lines through it; and effecting horizontal adjustment of the drive shaft until the plural vertical lines become one.

The method of the invention also further comprises causing a laser beam to be directed along and below the drive shaft in a vertical plane through the ends of said shaft toward the rear end of the vehicle;

causing said beam to be refracted at a 90° angle into secondary laser beams, first in one horizontal plane and then in a diametrically opposite horizontal plane at a point where in one direction the secondary beam is in a position to impinge on one wheel or brakedrum and in the other direction in a position to impinge on the other wheel or brakedrum and adjusting said rear axle as needed to make the points of impingement of said secondary beams symmetrical, whether on the wheels or brakedrums or some other axle element associated with the wheels or brakedrums, or upon some other element inserted along said axle to assist with measurement for adjustment of said symmetry or asymmetry.

The method of the invention further comprises said method wherein the laser beam is also intercepted in the vicinity of a universal joint therein by means capable of revealing deviation of the drive shaft from the normal position, and adjusting the drive shaft as needed to correct the deviation; such method in which the laser beam is intercepted by means adjacent the rearward end of the drive shaft as a red dot, the vertical axis of which means is aligned with a vertical diameter of the drive shaft and horizontal deviation of the drive shaft is shown up thereon as vertical lines; such method in which vertical lines are generated by opaque lines depending vertically from the center of the drive shaft one adjacent the middle of the drive shaft and another adjacent said rearward end; such method in which the laser beam is intercepted by means adjacent the rearward end of the drive shaft as a red dot, the vertical axis of which means is aligned with a vertical diameter of the drive shaft and vertical deviation of the drive shaft is shown up thereon as horizontal lines; and such method in which horizontal lines are generated by opaque lines depending vertically from the center of the drive shaft one adjacent the middle of the drive shaft and another adjacent said rearward end.

BRIEF DESCRIPTION OF THE DRAWINGS

FIG. 3 is a front elevation of a laser beam target of the invention;

FIG. 4 is a side elevation of FIG. 3;

FIG. 5 is a top view of FIG. 4;

DETAILED DESCRIPTION OF A PREFERRED EMBODIMENT

Figure 1:
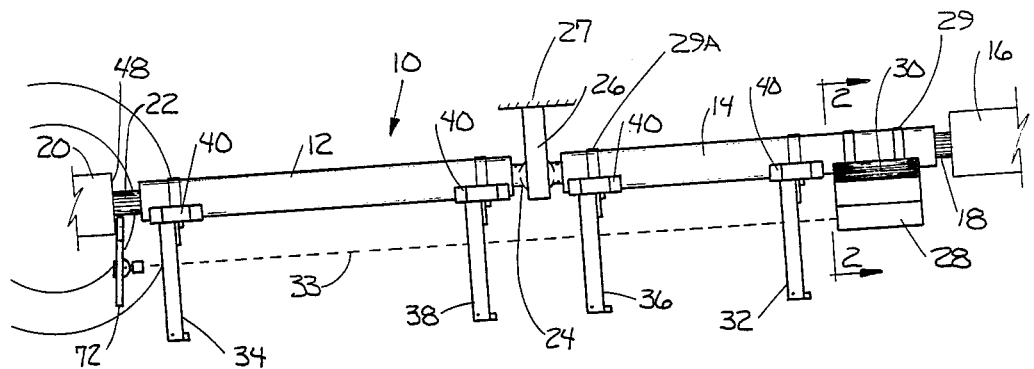
FIG. 1 is a side elevation of a power train according to the invention.
Figure 2:
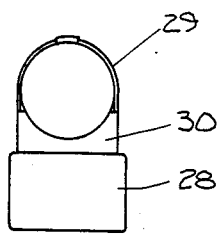
FIG. 2 is a section on line 2—2 of FIG. 1.

In the drawing, the numeral 10 designates a power train of a vehicle, in this case a heavy-duty, load-bearing vehicle (not shown) comprising a rear drive shaft segment 12, a forward drive shaft segment 14 connected to a transmission 16 by a driven spline 18. The rear drive shaft segment 12 is connected to a differential 20 by spline 22 and the two segments 12 and 14 are connected by a universal joint 24 which is supported by a hanger 26 affixed to the frame 27 so that the drive shaft segment 14 is generally horizontal or parallel to the frame of the vehicle.

A laser-beam generator 28 is mounted adjacent the forward end of the drive shaft segment 14 by a mounting means comprising a pillow-block 30 and straps 29 for drawing the pillow-block up tight to the shaft.

The laser-beam generator is provided with a level (not shown) or is of the design known in the art as a self-leveling, laser-beam generator. Means which may be in the shape of the pillow-block 30, is provided for adjusting the orientation of the laser-beam generator so that the laser beam, as projected, is generally parallel to a centerline connecting the two splines 18 and 22 as shown in the phantom line 33, or again a sophisticated laser-beam generator, such as are commonly used in the art for alignment of sewer tiles and determining the pitch thereof, can be used. These types, for example Dialgrades R 1160 (TM) manufactured and sold by Spectra Physics, Construction & Agricultural Division, 5475 Kellenburger Road, Dayton, Ohio 45424, are equipped with self-leveling devices and servomotors which, in response to push-button commands, will raise or lower the laser beam or move it sidewise as desired. It will suffice for this invention that the laser-beam generator be mounted so that the beam lies in a vertical plane through the centers of the two splines 18 and 22 and in a plane somewhat below and substantially parallel thereto.

To aid in lining up the laser beam 33, there are provided laser-beam targets 32 and 34 fastened to the drive shaft segments 12 and 14, one 32 adjacent the transmission end and the other 34 adjacent the differential end. These targets have mounting means 40, which will be described in detail further on, adapted to fix the targets on the drive shaft segments and center them thereon so that they depend vertically from the drive shaft and indicating means, to be more fully described later, which show the point of impingement of the laser beam thereon and means for measuring the distance of these points from the respective shaft segments. When the distance measured on target 34 is the same as that measured on target 32, especially if the latter is close to the laser-beam generator 28, the beam 33 is generally parallel to the centerline connecting the centers of the two splines 18 and 22.

It is to be understood that the view shown in FIG. 1 represents the vehicle under optimum load when the two segments 12 and 14 are substantially in straight-line alignment and that, when the vehicle is under no-load, or a sub-optimum load, the rear segment 12 will slope down at an angle from the universal joint 24 and thus be vertically skewed relative to the frame. As the rear wheels move up and down as a result of the loading of the vehicle or as a result of a bumpy road, this angle will vary accordingly.

Also, as a result of road condition or improper manufacture or servicing, the hanger 26 may become displaced so that the shaft segment 14 becomes skewed to the right or the left. Similarly, it is possible for the differential to become shifted to the right or the left, thus causing the shaft segment 12 to become skewed to the right or the left. The invention provides means for correcting these conditions.

For this purpose targets 38 and 36, which can be of the same design as targets 32 and 34, or of other design, are affixed, respectively, to the forward end of shaft segment 12 and the rearward end of shaft segment 14. These targets have means, to be more fully described, which reveal any deviation of the shaft segments from the vertical plane connecting the two splines and the normal or optimum horizontal position, whereupon adjustment can be made as needed to bring the shaft segment into proper alignment.

If desired one of the targets 36 and 38 can be omitted but the use of both has advantage, especially if the universal joint is worn so that the two segments of the drive shaft may be skewed somewhat relative one to the other. Otherwise one will suffice. Also, that one can be hung from the universal joint hanger 26, if desired, as long as the vertical cross hair is in line with the vertical diameter of an adjacent drive shaft.

Details of the construction of targets 32, 34, 36, and 38 are shown in FIGS. 3, 4, and 5. The target proper is designated by the numeral 50 at the top of which is the mounting means 40. The member 50 has two side members 52 and 54 depending from arms 56 of the support member 40. The support member 40 has a Y-shaped yoke member 58 the arms 59 of which have seating pads 60 of resilient material such that when the yoke is cinched up tight against the drive shaft by straps like the straps 29A, the member 50 is centered on a diameter of the shaft. By suitable angular adjustment of the member 50, the centerline thereof is brought into alignment with the vertical diameter of the shaft. Spirit levels 66 and 70 aid in this operation.

Slidably mounted in grooves 61 of the side members 52 and 54 is a plate member 62 made of semi-transparent material, that is, material transparent enough to pass the laser beam yet opaque enough to show the point of impingement of the laser beam thereon. The member 62 can be made of glass or plastic and has cross hairs 72 thereon, the vertical one of which is lined up with the centerline of the member 50 and, in the optimum adjustment on the shaft, with the vertical diameter thereof. At 68 there is shown a bolt with a wing nut for drawing the sides 52 and 54 together and thus setting the member 62 in whatever position to which it has been adjusted.

Figure 8:
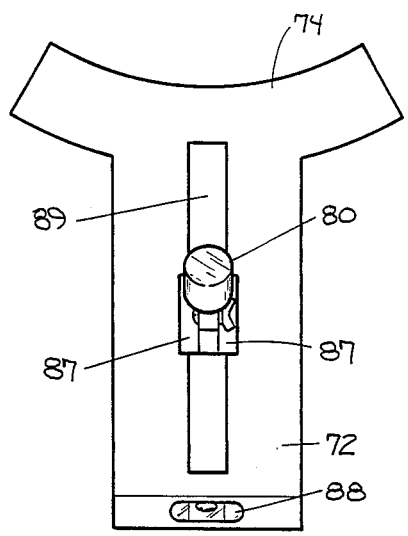
FIG. 8 is a front view of a prism-bearing target of the invention.
Figure 9:
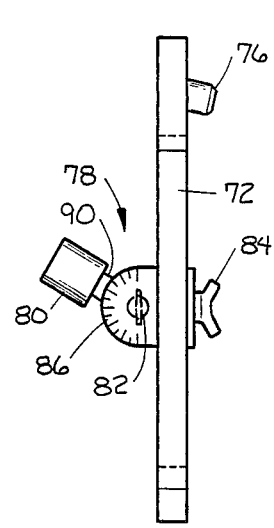
FIG. 9 is a side view of FIG. 8.
Figure 10:
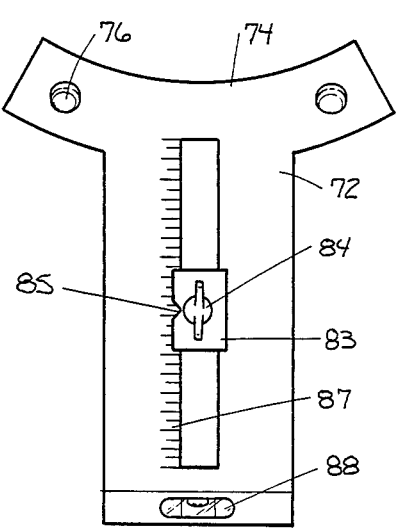
FIG. 10 is a rear view of FIG. 8.
Figure 6:
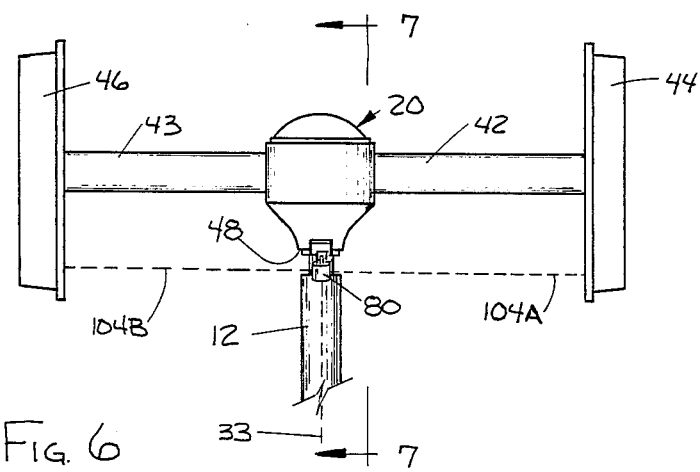
FIG. 6 is a bottom view of a differential--rear wheel assembly according to the invention.
Figure 7:
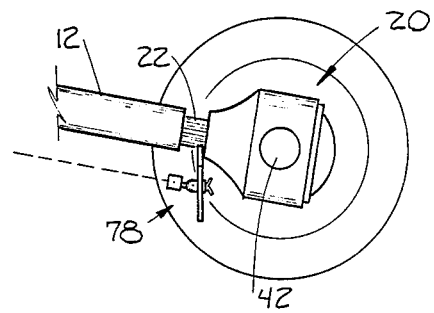
FIG. 7 is a section taken along line 7—7 of FIG. 6.

In FIG. 6 there is shown a view of the differential and rear wheels looking from the ground up. There are shown right and left rear axle segments 43 and 42 with wheels 44 and 46 or the brakedrums thereof attached the thereto. The differential is of conventional design and has an annular ring 48 bolted on to the spline-receiving end to which, after the removal of two or three bolts, a target 78 is fastened. Suitable such targets are shown in FIGS. 8, 9, and 10. The target 78 has two protuberances 76 which are shaped to fit into the bolt holes and canted at an angle so that the target hangs down vertically when the vehicle is being checked and is most likely to be under no load.

The target 78 comprises a base member 72 and a supporting yoke 74 having the protuberances 76 on the arms thereof and a curvature corresponding to the annular ring 48. It is to be understood, however, that the target can be affixed to the differential in other ways as long as it hangs down with its centerline in line with a vertical diameter of the adjacent drive shaft.

Figure 11:
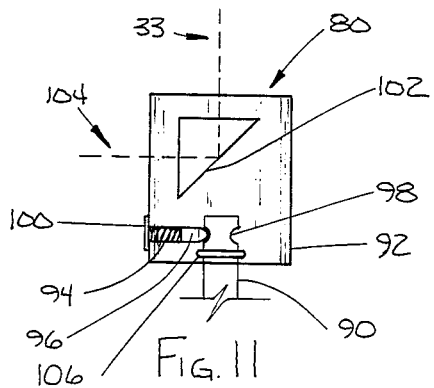
FIG. 11 is a detail view of the prism head of FIGS. 8 and 9.

As best seen in FIGS. 8, 9, and 10, there is shown a rear-axle aligning target having a base member 72 on which is a prism head 80 details of which are shown in FIG. 11. This prism head is mounted in a bracket 86 adapted to be moved up and down in vertical slot 89 (FIG. 8). The bracket 86 has two opposed semicircular sides 87 in which a rod-like prism-support member or mounting stem 90 is rotatably fastened by a bolt with a wing nut 82 whereby the prism can be set at a desired angle in or to the vertical and may have scale markings to delineate the angle at which the prism head 80 is set. The bracket 86 is fastened to the base member 72 by means of a bolt which passes through the slot 89 and is secured to the member 72 by a plate washer 83 and a wing nut 84. The washer 83 has a notch 85 to reveal the position thereof relative to the vertical scale on the edge of the slot 89. At 88 there is a spirit level to aid in adjusting the target.

It is to be understood that target 72 can be used with or without the other targets where only the rear end is to be checked but the alignment-determining target 34, with or without target 32, aids in aligning the laser beam with the prism-bearing target 72.

In FIG. 11 are shown details of the prism head 80. The prism 102 itself is mounted in a housing 92 in a conventional manner for admitting the primary laser beam 33 where it impinges on the front face of prism 102 at a 90° angle and exits as the secondary beam 104 from the side face of prism 102. The housing 92 is rotatable on its mounting stem 90 through at least an angle of 180° about an axis coincident with the primary laser beam 33. Desirably there are detents 98 in stem 90 to receive means, such as a spring-pressed ball 96, for causing the rotation to stop at 0° and 180°, oriented so that both secondary beams, the one projected to the right and the one projected to the left, are projected in a plane determined by the rear axle and the point of impingement of the laser beam on the prism. The projected beams will thus impinge on the wheels and, if the rear axle is properly aligned, the points of impingement will be symmetrical. If not, adjustment is indicated. Suitably the ball 96 can be spring-pressed by spring 94 in a suitable bore held compressed against the ball by a suitable detent 100. The stem 90 can be mounted for rotation in the housing 92 by any suitable means, for example, an O-ring 106, or in any well-known manner.

In carrying out the invention, one first attaches the laser generator 28 to the drive-shaft segment 14 adjacent the transmission 16, advantageously by the mounting means 29 and 30. Then a target 34 is installed on the drive shaft adjacent the differential 20 and the cross hairs are lined up with the aid of the spirit levels 66 and 70 so that the vertical cross hair is in vertical alignment with the vertical diameter of the shaft. The laser beam can be roughly adjusted at the same time.

Target 32 is then attached to the drive shaft as close as practical to the laser source, and adjusted as described for target 34. This target is adjusted so that the red dot (the laser image) is split by the horizontal cross hair. Targets 32 and 34, using the reference scales on the targets, are adjusted so that they match the laser beam, which is adjusted until the red dot is at the exact center of target 34, and the whole is readjusted as necessary to have the laser beam image split by the cross hairs of the two targets and to be essentially parallel to the centerline connecting the two splines 18 and 22. Considerable leeway is permitted here.

Targets 36 and 38 are now affixed to the drive shaft and adjusted as were the others but the cross hairs are set so that they are in the same relative position as the cross hairs of the other two targets as determined by the scales on the targets. Targets 32 and 34 are used in connection with aligning the beam and are accordingly designated herein as alignment targets whereas targets 36 and 38 are use for the purpose of determining malalignment and are so designated herein. Under load, when the shaft segments are substantially in axial alignment, the centers of the cross hairs of targets 36 and 38 will be in substantial alignment with the centers of the cross hairs of targets 32 and 34 but not so under no-load. Then the cross hairs of the malalignment-determining targets will have their centers out of alignment to a degree determinable by the Vernier scales on the sides of the targets. If desired, the centers of the cross hairs of the malalignment-determining targets need not be in any set relation to those of the alignment-determining targets because the differences as determined by the respective scales on the targets can be correlated with existing manufacturer's data for the particular vehicle being serviced. Thus vertical maladjustment generally can be readily detected and corrected. If desired, the amount of deflection due to load can be anticipated and taken into account according to how far the horizontal cross hairs are above or below the laser beam. Manufacturer's data and information are available for this purpose for any particular vehicle model.

Figure 12:
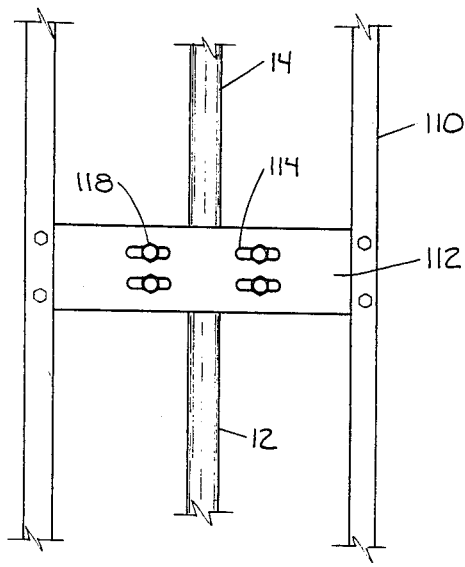
FIG. 12 is a partial view showing the frame of the vehicle looking down.
Figure 13:
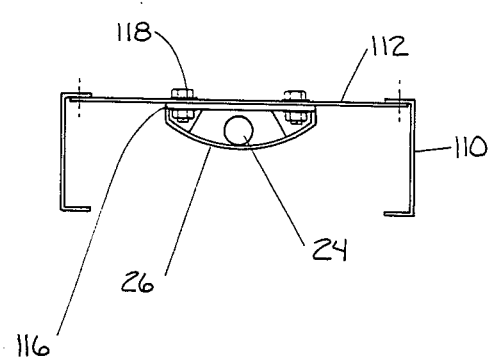
FIG. 13 is an end view of FIG. 12.

In contrast, malalignment horizontally is shown simply by more than one vertical line showing up in the red dot on target 34. Thus, if a straight line multisection drive shaft is being tested, horizontal error will show up as more than one vertical line and adjustment can be made at the yoke as shown generally at 26 in FIG. 1 and in more detail in FIGS. 12 and 13. Vertical errors may be corrected by inserting one or more shims 116 until elimination of any extra horizontal lines on target 34. To eliminate horizontal error, adjustment is made of yoke 26 laterally by means of bolts 118 in slots 114 in crosspiece 112 of frame 110 until disappearance of any extra vertical lines on target 34.

The rear end can be checked either before or after the drive shaft. First, the prism-bearing target 72 is installed and laser beam adjusted, if necessary, so that it strikes the prism. Then the prism head 80 is adjusted by means of the scale thereon to match the slope of the laser beam and the angle readjusted, if necessary. When properly adjusted the prism head 80 will give off, alternately, right and left secondary laser beams 104 which will be in the plane delineated by the point of impingement of the beam on the prism and the centerline of the rear axle. These secondary laser beams will be at right angles to the primary laser beam and horizontal when the vehicle is resting on a horizontal surface. If these alternate secondary beams, which are obtained by rotating the prism head through an angle of 180°, do not strike the wheels or brakedrums or some other axle element associated with the wheels or brakedrums, or some other element inserted along the axle to assist with measuring and adjusting any asymmetry in the same relative position, the axle is out of alignment and adjustment should be made accordingly.

The following practical Examples are given to further illustrate the practice of the invention, but are not to be construed as limiting:

PRACTICAL EXAMPLE 1

DRIVE SHAFT AND AXLE ALIGNMENT FOR STRAIGHT LINE MULTISECTIONAL DRIVE SHAFT

STEP 1 Install laser on drive shaft at rear of transmission by means of straps.
STEP 2 Install target at farthest point on drive shaft, e.g., by means of straps.
STEP 3 Level target by means of level vial on target.
STEP 4 Roughly align laser beam to strike horizontal and vertical lines on target.
STEP 5 Install target at closest point to laser on drive shaft, e.g., by means of straps.
STEP 6 Level that target by means of level vial on target.
STEP 7 Adjust target closest to laser so that red dot is split in half by horizontal line on target.
STEP 8 Read reference scale on inside lip of target and adjust farthest target to match reference scale of target closest to laser.
STEP 9 Fine adjust laser to strike farthest target at intersection of target reference lines.
STEP 10 Adjust intermediate target's scale to match known number, same as on the two targets already installed.
STEP 11 Install two intermediate targets, e.g., by means of straps.
STEP 12 Level intermediate targets by means of level vials on targets.
STEP 13 Read error at farthest target by seeing more than one vertical or horizontal line appearing in the red dot of the laser beam (shadow from intermediate target or targets).
STEP 14 If we are aligning a straight line multisection drive shaft, we can at this time see the vertical error by looking at the farthest target and observing if there is more than one horizontal line in the red dot of the laser beam.
STEP 15 The vertical adjustment can now be made at the yoke 26, see FIG. 13, by inserting one or more shims 116 to eliminate any extra horizontal lines o the farthest target.
STEP 16 The horizontal adjustment can now be made by adjusting yoke 26 laterally by means of bolts 118 in slots 114 until disappearance of any extra vertical lines on the farthest target.
STEP 17 Install prism head target to lower section of differential.
STEP 18 Adjust prism head target so it is struck by laser beam.
STEP 19 Adjust prism head by means of caliper scale on prism to match slope reading from self-leveling laser beam.
STEP 20 Manually rotate prism head to check both rear brakedrum housings for proper alignment.
STEP 21 If the beam does not strike the same two points on the brakedrum housings, adjust the rear axle so that it does.

Alignment is now complete.

PRACTICAL EXAMPLE 2

FOR A DRIVE SHAFT THAT IS MULTISLOPE AND MULTISECTIONAL, FOLLOW STEPS 1 THROUGH 13 THEN, TO ADJUST THE HORIZONTAL ERROR, FOLLOW THESE STEPS:

STEP A Adjust the intermediate targets so that the scale number on the Vernier scales all read the same.
STEP B Adjust the slope of the laser beam to hit the intermediate target at intersection of the cross hairs.
STEP C Read the slope in the laser slope-indicating window and compare to factory specifications and adjust the drive shaft slope to factory specifications, or simply set the beam to the specifications and then adjust the drive shaft slope to factory specifications (same slope). Steps 15 through 21 may now be followed.

It will be seen from the above description that the apparatus and method of the invention provides unique and effective means and method for determining maladjustments in components of the drive train of a vehicle having a transmission, drive shaft, and differential, and especially a heavy-duty, load-bearing vehicle.

While the invention has been described with reference to a preferred embodiment, it is to be understood that it is not limited thereto, as many variations will occur to those skilled in the art, once they are aware of this disclosure, which are within the valid scope of the invention.

We claim:

1. Apparatus for detecting malalignment of elements of a drive train of a vehicle in which said elements include a transmission and a differential, an articulated drive shaft means comprising segments coupled by universal-joint means, one segment of which is connected by a driven connecting means with said transmission and another segment of which is connected by a drive connecting means with said differential which has right and left rear axle components adapted to drive right and left wheels and in which said drive train, in its optimum condition, has the forward element of said drive shaft aligned substantially in a horizontal plane parallel to the frame of said vehicle, has all segments of said drive shaft aligned in a vertical plane delineated by a centerline which connects both said driven connecting means and said drive connecting means, and has said axle normal to said vertical plane, which apparatus comprises:
   means for generating a laser beam in predetermined horizontally-spaced relation to said drive train
   means for causing said beam to be projected in said vertical plane below and substantially parallel to said centerline; and
   maladjustment-determining laser-beam target means interposed in the path of the laser beam having means thereon delineating any deviation of the drive train from said optimum when the laser beam impinges thereon.

2. Apparatus of claim 1 in which a drive-shaft maladjustment-determining target means is located adjacent said universal joint means where it is responsive to any deviation from the optimum relative to said vertical and horizontal planes.

3. Apparatus of claim 1 in which a rear-axle maladjustment-determining target means is disposed in proximity to said axle and comprises prism means rotatable through 180° from one horizontal position to another which causes the laser beam to be bent at 90° and projected in a plane, determined by the point where the beam is bent and the rear axle, in a direction in a position to impinge on one wheel or brakedrum, and then is bent in the opposite direction by the same prism rotated 180° and projected in the same plane in the opposite direction in a position to impinge on the other wheel or brakedrum, whereby any deviation from the normal position of the rear axle is shown.

4. Apparatus of claim 1 in which alignment-determining target means is located adjacent to each said connecting means for determining when said laser beam is properly aligned, said targets being sufficiently transparent to pass said laser beam and sufficiently opaque that the point of impingement of the laser beam thereon is visible.

5. Apparatus of claim 4 in which each said alignment-determining and said maladjustment-determining laser-beam target means comprises a semi-transparent member having cross hairs thereon arranged in vertical and horizontal positions and means for adjusting the position of said member up and down relative to said drive shaft, and means for affixing said laser-beam target means to said drive shaft so that the vertical cross hair is in alignment with the center of said shaft at the point of attachment.

6. Apparatus of claim 2 in which there are two said drive-shaft maladjustment-determining laser-beam target means adjacent to said universal joint means, one on the transmission side of the universal joint means and the other on the differential side of the universal joint means.

7. Apparatus of claim 3 in which the prism-carrying laser-beam target means comprises a base member having mounted thereon a rotatable prism means which can be rotated 180° from one horizontal to another in a direction normal to said laser beam and adjusted angularly up and down in said vertical plane as needed to present a face of said prism normal to the primary laser beam whereby, when the primary laser beam impinges on said face, it is bent at 90° to form a secondary laser beam, said base member being affixed to said differential in a position such that, when the secondary laser beam is directed along the left horizontal, it is in position to impinge on the left wheel or brakedrum and, when it is directed along the right horizontal, it is in position to impinge on the right wheel or brakedrum, whereby any malalignment of the rear axle from its normal position normal to said vertical plane will be revealed by any asymmetry between the left and right points of impingement.

8. Apparatus of claim 4 in which alignment-determining and maladjustment-determining target means comprises cross hairs thereon arranged in vertical and horizontal positions and means whereby the position of the cross hairs can be adjusted up and down relative to said drive shaft, and means for affixing said target means to said drive shaft so that the vertical cross hairs are in alignment with the center of the shaft at the point of attachment.

9. Apparatus for aligning an articulated drive shaft of a heavy-duty, load-carrying vehicle in which said drive shaft has segments which are coupled by universal joint means and has a driven connecting means which is driven by a transmission and a drive connecting means which drives a differential; in which the first segment of the articulated drive shaft, in its optimal position, is fixed in a substantially horizontal plane parallel with the frame of said vehicle and in a longitudinal vertical plane which passes through a centerline which connects the driven and drive connecting means; in which the last section is adapted to pivot up and down about a universal joint means to a plus or minus or zero angle determined by the load placed on said vehicle; and in which the position of said universal joint is prone to lateral maladjustment due to improper servicing and/or road conditions; which apparatus comprises:
   means for generating a laser beam in predetermined horizontally-spaced relation to said drive shaft;
   means for causing said beam to be projected along the juncture of said vertical plane and a horizontal plane located below and substantially parallel to said centerline; and maladjustment-determining laser-beam target means in the path of the laser beam attached to said drive shaft adjacent said universal joint and operative to show where the laser beam impinges on said target, said target means being positioned relative to said vertical and horizontal planes so that the position of the laser beam impingement thereon shows any maladjustment relative to said planes, whereby the position of said universal joint means can be adjusted as needed to bring said segments of said drive shaft into optimum alignment; in which said maladjustment-determining laser-beam target means comprises cross hairs thereon arranged in vertical and horizontal positions and means whereby the position of the cross hairs can be adjusted up and down relative to the point of impingement of the laser beam, and means for affixing said maladjustment-determining laser-beam target means to said drive shaft so that the vertical cross hair is in vertical alignment with the center of said shaft at the point of attachment, said target means being sufficiently opaque that the point of impingement of the laser beam thereon is visible; in which there are two said maladjustment-determining laser-beam target means adjacent to a universal joint means, one on the transmission side of the universal joint means and the other on the differential side of the universal joint means, said last named target means being sufficiently transparent to pass the laser beam and sufficiently opaque that the point of impingement thereon of the laser beam is visible; in which alignment-determining target means are located adjacent to said connecting means for determining the alignment of said laser beam, at least the targets between the driven connecting means and the drive connecting means being sufficiently transparent to pass said laser beam and all the targets being sufficiently opaque that the point of impingement of the laser beam thereon is visible; and in which the alignment-determining, laser-beam target means comprises cross hairs thereon arranged in vertical and horizontal positions and means for adjusting the position of the cross hairs up or down relative to the point of impingement of the laser beam, and means for affixing said alignment-determining, laser-beam target means to said drive shaft so that the vertical cross hair of each target is in alignment with the center of said shaft at the point of attachment, whereby, when the segments of the drive shaft are aligned both horizontally and vertically and when the cross hairs of any one target are the same distance from the said centerline as any other target, the laser beam impinges at the junction of said cross hairs and is parallel to the said centerline.

10. Target means useful for alignment of parts of the drive train of a vehicle, which comprises a base member, mounting means at the top thereof useful for mounting the base member on a vehicle with its centerline in a vertical depending position, indicating means for indicating when the centerline is in the vertical position, and laser-beam receptor and indicator means on said base member, said receptor being mounted for adjustment up or down on said base member on said centerline.

11. Target means of claim 10 in which the laser-beam receptor means comprises a semi-transparent plate mounted for vertical sliding movement on said base member, means for locking said plate in whatever position it has been adjusted to, said plate having cross hairs, the vertical one of which is adapted to be aligned in the centerline of said base member, and being sufficiently transparent to pass said laser beam and sufficently opaque that the point of impingment of the laser beam thereon is visible.

12. Target means of claim 11 in which the mounting means comprises a Y-shaped yoke adapted to staddle the underside of a drive shaft and means affixed to the opposite arms thereof adapted to tighten said yoke against a drive shaft.

13. Target means of claim 10 in which the laser-beam receptor comprises a rotatable prism which is adjustable angularly up and down in a vertical plane as needed to present a face of the prism normal to a primary laser beam and is adapted to be rotated through an angle of 180° from one position in which the secondary beam exiting therefrom is normal to the primary laser beam.

14. Target means of claim 13 in which the mounting means comprises a Y-shaped yoke adapted to fit the underside of a differential and having protuberances on each arm of the yoke adapted to be inserted in bolt-holes in the differential, said protuberances being canted so that said base member hangs down at an angle.

15. A method for correcting malalignment of elements of a drive train of a vehicle in which said elements include a transmission and a differential, an articulated drive shaft means comprising segments coupled by universal-joint means, one segment of which is connected by a driven connecting means with said transmission and another segment of which is connected by a drive connecting means with said differential which has right and left rear axle components adapted to drive wheels and in which said drive train, in its optimum condition, has the forward element of said drive shaft aligned substantially in a horizontal plane parallel to the frame of said vehicle, has all segments of said drive shaft aligned in a vertical plane delineated by a centerline which connects both said driven connecting means and said drive connecting means, and has said axle normal to said vertical plane, which method comprises:

generating a laser beam using laser-beam generating means;

causing said beam to the projected in said vertical plan below and substantially parallel to said centerline;

interposing maladjustment-determining laser-beam target means in the path of the laser beam having means thereon delineating any deviation of the drive train from said optimum when the laser leam impinges thereon; and adjusting said drive train to correct the maladjustment thus revealed.

16. A method of claim 15 which further comprises affixing an alignment-determining target having vertically adjustable cross hairs to said drive shaft adjacent to said differential in a manner such that a vertical cross hair is in alignment with a vertical diameter of said shaft;

mounting a laser beam generator on the opposite end of said drive shaft and adjusting the laser beam generally to impinge on said target in the vicinity of said cross hairs;

affixing a second alignment-determining target having vertically adjustable cross hairs to said drive shaft adjacent said laser-beam generator;

adjusting said cross hairs and said laser beam to bring them into alignment with the laser beam diametrically below and substantially parallel to the centerline connecting the opposite ends of said drive shaft;

affixing maladjustment-determining target means having vertically adjustable cross hairs one of which is in vertical alignment with a vertical diameter of said shaft to said shaft adjacent the midportion thereof;

said targets being semi-transparent and the point of impingement of the laser beam thereon showing up thereon as red dot which, when there is horizontal malalignment, on the remote alignment-determining target has plural vertical lines through it; and effecting horizontal adjustment of the drive shaft until the plural vertical lines become one.

17. A method of claim 16 which further comprises causing said laser beam to be refracted at a 90° angle into secondary laser beams, first in one horizontal plane and then in a diametrically opposite horizontal plane at a point where in one direction the secondary beam is in a position to impinge on one wheel and in the other direction on the other wheel and adjusting said rear axle as needed to make points of impingement of said secondary beams symmetrical.

18. A method for aligning elements of a drive train of a vehicle which includes drive shaft means connected by a driven connecting means with a transmission and by a drive connecting means with a differential which has right and left rear axle components adapted to drive right and left wheels, said method being adapted for the alignment of a drive train which includes forward and rear drive shaft end portions connecting said connecting means, which method comprises:

generating a laser beam using laser-beam generating means;

causing said beam to be projected substantially parallel and somewhat below the centerline connecting said connecting means; and interposing maladjustment-determining, laser-beam target means in the path of the laser beam capable of detecting any deviation of the rear axle from the normal.

19. Method of claim 18 in which the laser beam is refracted at 90° in a horizontal plane in a position to impinge on a wheel or brakedrum of the vehicle and then refracted in the diametrically opposite direction in a position to impinge on the other wheel or brakedrum, and measuring any deviation from the normal as shown by asymmetry in points of impingement of the beam and adjusting to eliminate the asymmetry.

20. Method of claim 19 in which the laser beam is also intercepted in the vicinity of a universal joint in said drive train by means capable of revealing deviation of the drive shaft from the normal position, and adjusting the drive shaft as needed to correct the deviation.

21. Method of claim 20 in which the laser beam is intercepted by means adjacent the rearward end of the drive shaft as a red dot, the vertical axis of which means is aligned with a vertical diameter of the drive shaft, and the horizontal deviation of the drive shaft being shown up thereon as vertical lines.

22. Method of claim 21 in which vertical lines are generated by opaque lines depending vertically from the center of the drive shaft one adjacent the middle of the drive shaft and another adjacent said rearward end.

23. Method of claim 20 in which the laser beam is intercepted by means adjacent the rearward end of the drive shaft as a red dot, the vertical axis of which means is aligned with a vertical diameter of the drive shaft, and the vertical deviation of the drive shaft being shown up thereon as horizontal lines.

24. Method of claim 23 in which horizontal lines are generated by opaque lines depending vertically from the center of the drive shaft one adjacent the middle of the drive shaft and another adjacent said rearward end.

* * * * *

UNITED STATES PATENT AND TRADEMARK OFFICE
CERTIFICATE OF CORRECTION

PATENT NO. : 4,844,609

DATED : July 4, 1989

INVENTOR(S) : Scot T. Floyd and Michael P. McGarry

It is certified that error appears in the above-identified patent and that said Letters Patent is hereby corrected as shown below:

Col. 7, line 51; delete "the" (first occurence)

Col. 10, line 37; "o" should read -- on --
Col. 11, line 37; "train" should read -- train; --
Col. 14, line 55; "leam" should read -- beam --

Signed and Sealed this

Twelfth Day of June, 1990

Attest:

HARRY F. MANBECK, JR.

Attesting Officer

Commissioner of Patents and Trademarks